(12) United States Patent
King

(10) Patent No.: US 10,071,280 B2
(45) Date of Patent: Sep. 11, 2018

(54) ARM EXERCISE DEVICE AND SYSTEM

(71) Applicant: Callaghan Innovation, Lower Hutt (NZ)

(72) Inventor: Marcus King, Christchurch (NZ)

(73) Assignee: Callaghan Innovation, Lower Hutt (NZ)

( * ) Notice: Subject to any disclaimer, the term of this patent is extended or adjusted under 35 U.S.C. 154(b) by 236 days.

(21) Appl. No.: 14/441,030

(22) PCT Filed: Nov. 30, 2012

(86) PCT No.: PCT/NZ2012/000223
§ 371 (c)(1),
(2) Date: May 6, 2015

(87) PCT Pub. No.: WO2014/073982
PCT Pub. Date: May 15, 2014

(65) Prior Publication Data
US 2015/0290494 A1 Oct. 15, 2015

(30) Foreign Application Priority Data

Nov. 7, 2012 (NZ) ........................................ 603451

(51) Int. Cl.
*A63B 71/00* (2006.01)
*A63B 23/14* (2006.01)
(Continued)

(52) U.S. Cl.
CPC ...... *A63B 24/0003* (2013.01); *A63B 21/0004* (2013.01); *A63B 21/00047* (2013.01);
(Continued)

(58) Field of Classification Search
CPC combination set(s) only.
See application file for complete search history.

(56) References Cited

U.S. PATENT DOCUMENTS

| 4,573,682 A | * | 3/1986 | Mayon | A63F 13/02 248/176.1 |
| 2006/0106326 A1 | * | 5/2006 | Krebs | A61H 1/0274 601/40 |
| 2011/0237400 A1 | * | 9/2011 | King | A61H 1/0274 482/8 |

FOREIGN PATENT DOCUMENTS

WO WO-2014073982 A1 5/2014

OTHER PUBLICATIONS

Jordan, Kimberlee, et al., Chapter 8. Augmented Reality Assisted Upper Limb Rehabilitation Following Stroke, Edited by Dr. Andrew Yeh Ching Nee, Publisher: InTech, [online]. Retrieved from the Internet: http://www.intechopen.com/books/augmented-reality-some-emerging-application-areas/augmented-reality-assisted-upper-limb-rehabilitation-following-stroke, (Dec. 9, 2011), 155-174.
(Continued)

*Primary Examiner* — Sundhara Ganesan
*Assistant Examiner* — Shila Jalalzadeh Abyan
(74) *Attorney, Agent, or Firm* — Schwegman Lundberg & Woessner, P.A.

(57) ABSTRACT

An arm rehabilitation system for exercising a user's arm. The system provides an arm support device moveable upon a support surface by a user's first arm. The arm support device has a main body configured to movably engage the support surface on one side and has a hand support portion on an opposing side at or toward one end of the body for supporting a user's hand of the first arm. A primary hand support formation protrudes from the hand support portion and a secondary hand support handle extends from the main body at or toward the periphery of the hand support portion. An adjustable switch support boom assembly is also mounted to the main body and has at least one operable user input component for generating an actuation signal in response to operation by the user. An onboard motion
(Continued)

tracking system mounted to or within the main body is configured to sense motion of the main body to enable user interaction with an interactive computer system running an application program.

43 Claims, 7 Drawing Sheets

(51) Int. Cl.
    *A63B 23/16* (2006.01)
    *A63B 24/00* (2006.01)
    *A63B 71/06* (2006.01)
    *A63B 23/12* (2006.01)
    *A63B 21/00* (2006.01)
    *A63B 21/012* (2006.01)
    *A63B 23/035* (2006.01)
    *A63B 22/20* (2006.01)
    *A63F 13/428* (2014.01)
    *A63F 13/24* (2014.01)
    *A63F 13/67* (2014.01)
    *A63B 21/015* (2006.01)
    *A63B 21/22* (2006.01)
    *A63F 13/211* (2014.01)
    *A63F 13/213* (2014.01)

(52) U.S. Cl.
    CPC ........ *A63B 21/012* (2013.01); *A63B 21/4017* (2015.10); *A63B 21/4019* (2015.10); *A63B 21/4021* (2015.10); *A63B 21/4025* (2015.10); *A63B 21/4035* (2015.10); *A63B 21/4043* (2015.10); *A63B 22/201* (2013.01); *A63B 23/03508* (2013.01); *A63B 23/1281* (2013.01); *A63B 23/14* (2013.01); *A63B 23/16* (2013.01); *A63B 71/0622* (2013.01); *A63F 13/24* (2014.09); *A63F 13/428* (2014.09); *A63F 13/67* (2014.09); *A63B 21/015* (2013.01); *A63B 21/225* (2013.01); *A63B 22/203* (2013.01); *A63B 2022/206* (2013.01); *A63B 2024/0068* (2013.01); *A63B 2024/0071* (2013.01); *A63B 2024/0096* (2013.01); *A63B 2071/0638* (2013.01); *A63B 2071/0647* (2013.01); *A63B 2210/54* (2013.01); *A63B 2220/805* (2013.01); *A63B 2220/806* (2013.01); *A63B 2220/833* (2013.01); *A63B 2225/093* (2013.01); *A63B 2225/50* (2013.01); *A63B 2225/54* (2013.01); *A63F 13/211* (2014.09); *A63F 13/213* (2014.09)

(56) References Cited

OTHER PUBLICATIONS

"International Application Serial No. PCT/NZ2012/000223, International Search Report dated Feb. 21, 2013", 4 pgs.

"International Application Serial No. PCT/NZ2012/000223, Written Opinion dated Feb. 21, 2013", 3 pgs.

* cited by examiner

ARM EXERCISE DEVICE AND SYSTEM

PRIORITY APPLICATIONS

This application is a U.S. National Stage Application filed under 35 U.S.C. § 371 from International Application No. PCT/NZ2012/000223, filed on 30 Nov. 2012 and published as WO/2014/073982 on 15 May 2015, which claims the benefit of priority under 35 U.S.C. § 119 to New Zealand Application No. 603451, filed on 7 Nov. 2012; which applications and publication are incorporated herein by reference in their entirety.

FIELD OF THE INVENTION

The invention generally relates to an arm exercise system. In particular, although not exclusively, the exercise system is suitable for rehabilitation exercise.

BACKGROUND TO THE INVENTION

Exercise systems can be used to help rehabilitate patients who have suffered a muscular or neurological disorder. Often, gravity eliminated arm exercises are prescribed to patients who have suffered a muscular or neurological disorder relating to an upper limb, such as hemiparesis resulting in partial paralysis of one arm.

Some exercise devices have been developed to assist with rehabilitation of the affected limbs by enabling a patient to carry out the prescribed gravity eliminated arm exercises. One example is an overhead arm sling support mechanism. An arm sling is supported from above by a frame. The patient may insert their arm into the sling and perform repetitive movements for extended periods of time in order to exercise it, while the arm is supported against gravity. Another example of a device is an arm skate-board. An arm skate-board is a platform mounted on a set of four castor wheels allowing free movement across a table top. The patient may rest their arm on the platform and perform repetitive movements for extended periods of time in order to exercise it. Larger, more complex and expensive robotic exercise systems are also known.

It is an object of the present invention to provide an improved arm exercise device and system, or to at least provide the public with a useful choice.

SUMMARY OF THE INVENTION

In a first aspect, the invention may broadly be said to consist of an arm rehabilitation system for exercising a user's arm, comprising:
  an arm support device moveable upon a support surface by a user's first arm when the arm is supported by the arm support device, the arm support device comprising:
    a main body configured to movably engage the support surface on one side and comprising a hand support portion on an opposing side at or toward one end of the body for supporting a user's hand of the first arm;
    a primary hand support formation protruding from the hand support portion and shaped to engage with the palm and/or fingers of the user's hand of the first arm;
    a secondary hand support handle extending from the main body at or toward the periphery of the hand support portion for gripping by the hand of the user's second arm;
    an adjustable switch support boom assembly mounted to the main body and having at least one operable user input component for generating an actuation signal in response to operation by the user, the switch support boom assembly enabling adjustment of the position of the input component(s) relative to the user's hand and/or fingers of the first arm;
    an onboard motion tracking system mounted to or within the main body which is configured to sense motion of the main body relative to the support surface and generate a representative motion signal; and
  an interactive computer system comprising a processor running an application program displayed on a visual display and which is in signal communication with the arm support device, the computer system receiving and processing the motion and/or actuation signals to enable the user to interact with the application program via the arm support device.

Preferably the user input component(s) is(are) any one or more of switches, hand clickers, or other operable dials, buttons or knobs. Preferably the user input component is a switch.

Preferably the main body further comprises a forearm support portion at or toward the opposite end of the hand support portion for supporting the user's forearm of the first arm.

In one form, the hand support portion and forearm support portion are integrally formed to provide the main body.

In another form, the forearm support portion and the hand support portion are releasably coupled to each other to form the main body. Preferably the forearm support portion and the hand support portion comprise complementary formations for releasably coupling to each other.

Preferably the adjustable switch support boom is adjustable in height and orientation relative to the main body to enable adjustment of the position of the switch(es) relative to the user's hand and/or fingers of the first arm.

Preferably the adjustable switch support boom comprises a first arm rotatably coupled to the main body and a second arm hingedly coupled to the first arm for adjusting the height and orientation of the boom. Preferably the first arm is rotatable about an axis orthogonal to the major plane of the main body, and the second arm is rotatable about an axis parallel to the major plane of the main body.

Preferably the switch(es) is(are) releasably and/or moveably coupled to the boom such that their position along the boom may be altered. Preferably switch(es) is(are) coupled to the first and/or second arm of the boom via hook and loop fasteners.

Preferably the main body comprises a plurality of mounting apertures about a periphery of the hand support portion for removably mounting the switch support boom and/or the secondary hand support handle.

In the preferred embodiment the main body is configured to slidably engage the surface. Preferably the main body comprises a low friction material on the side of the main body configured to slidably engage the surface. Preferably the material is in the form of a slider strip located along or near the periphery of the main body, and preferably around a substantial portion of the periphery.

In an alternative embodiment the main body is configured to rollably engage the surface via one or more wheels for example. The main body may comprise one or more support wheels located substantially directly below the hand support portion and wherein one or more of those wheels has an associated actuator that is operable to apply a level of braking to resist movement of the wheel(s). The one or more of the actuator(s) may be non-powered and manually operable to adjust the level of braking applied to resist movement of the wheel(s) or they may be electronically controlled actuator(s) and the computer system may control the actuator(s) onboard the arm support device remotely over a wireless connection. The one or more support wheel(s) may be arranged to support the main body for movement in any direction over the surface.

By way of example, the wheels may comprise any one or more of the following types of wheels: caster wheels, ball casters, or onmi-wheels.

In a preferred embodiment the onboard motion tracking system is a conventional computer mouse mounted within the main body and configured to obtain data representative of the motion and/or position of the mouse relative to the support surface and transmit the data to the computer system. The data may be transmitted wirelessly via infrared or directly through a cable such as a universal serial bus.

In an alternative embodiment the onboard motion tracking system is an optical sensor arranged to capture continuous digital images of the support surface or a portion of the support surface on which the arm support device moves, and to generate image data representative of the motion and/or position of the arm support device. An image processing system on board the arm support device or integrated into the computer system receives and processes the image data to generate motion and/or positional data for processing by the computer system processor.

Preferably the secondary hand support handle comprises at least one operable switch. Preferably the switch(es) is(are) movably mounted to the secondary support handle via hook and loop fasteners.

Preferably the arm support device further comprises an associated fastening system that is operable to secure the user's forearm and/or hand to or within the main body. In some embodiments the forearm support portion of the main body forms a substantially U-shaped channel within which a user's a forearm is received and retained during use of the system.

Preferably the primary hand support formation is a substantially hemispherical grip surface upon which the user may rest their hand when moving the main body over the surface. More preferably, the primary hand support formation is removably mounted to the hand support portion of the main body.

Preferably the application program is a game that is presented on the display screen of the computer system and the computer system is arranged such that movement of the arm support device over the surface by the user causes a corresponding movement of a game cursor on the game screen so as to enable the user to interact with the game. Activation of the switch (es) also causes further interaction with the game.

In a second aspect, the invention may broadly be said to consist of an arm exercise device for rehabilitation that is moveable upon a support surface by a user's first arm when the arm is supported by the arm exercise device, the device comprising:

a main body configured to movably engage the support surface on one side and comprising a hand support portion on an opposing side at or toward one end of the body for supporting a user's hand of the first arm;

a primary hand support formation protruding from the hand support portion and shaped to engage with the palm and/or fingers of the user's hand of the first arm;

a secondary hand support handle extending from the main body at or toward the periphery of the hand support portion for gripping by the hand of the user's second arm;

an adjustable switch support boom assembly mounted to the main body and having at least one operable user input component for generating an actuation signal in response to operation by the user, the switch support boom assembly enabling adjustment of the position of the input component(s) relative to the user's hand and/or fingers of the first arm; and an onboard motion tracking system mounted to or within the main body which is configured to sense motion of the main body relative to the support surface and generate a representative motion signal, and wherein the arm exercise device is configured to communicatively couple to an interactive computer system to communicate the generated motion and/or actuation signals to the interactive computer system in use, and enable user interaction with the computer system via the arm exercise device.

Preferably the user input component(s) is(are) any one or more of switches, hand clickers, or other operable dials, buttons or knobs. Preferably the user input component is a switch.

Preferably the interactive computer system comprising a processor running an application program displayed on a visual display and which is in signal communication with the arm exercise device in use, the computer system receiving and processing the motion and/or switch signals to enable the user to interact with the application program via the arm exercise device.

Preferably the main body further comprises a forearm support portion at or toward the opposite end of the hand support portion for supporting the user's forearm of the first arm.

In one form, the hand support portion and forearm support portion are integrally formed to provide the main body.

In another form, the forearm support portion and the hand support portion are releasably coupled to each other to form the main body. Preferably the forearm support portion and the hand support portion comprise complementary formations for releasably coupling to each other.

Preferably the adjustable switch support boom is adjustable in height and orientation relative to the main body to enable adjustment of the position of the switch(es) relative to the user's hand and/or fingers of the first arm.

Preferably the adjustable switch support boom comprises a first arm rotatably coupled to the main body and a second arm hingedly coupled to the first arm for adjusting the height and orientation of the boom. Preferably the first arm is rotatable about an axis orthogonal to the major plane of the main body, and the second arm is rotatable about an axis parallel to the major plane of the main body.

Preferably the switch(es) is(are) releasably and/or moveably coupled to the boom such that their porision along the boom may be altered. Preferably switch(es) is(are) coupled to the first and/or second arm of the boom via hook and loop fasteners.

Preferably the main body comprises a plurality of mounting apertures about a periphery of the hand support portion for removably mounting the switch support boom and/or the secondary hand support handle.

In the preferred embodiment the main body is configured to slidably engage the surface. Preferably the main body comprises a low friction material on the side of the main body configured to slidably engage the surface. Preferably the material is in the form of a slider strip located along or near the periphery of the main body, and preferably around a substantial portion of the periphery.

In an alternative embodiment the main body is configured to rollably engage the surface via one or more wheels for example. The main body may comprise one or more support wheels located substantially directly below the hand support portion and wherein one or more of those wheels has an associated actuator that is operable to apply a level of braking to resist movement of the wheel(s). The one or more of the actuator(s) may be non-powered and manually operable to adjust the level of braking applied to resist movement of the wheel(s) or they may be electronically controlled actuator(s) and the computer system may control the actuator(s) onboard the arm exercise device remotely over a wireless connection. The one or more support wheel(s) may be arranged to support the main body for movement in any direction over the surface.

By way of example, the wheels may comprise any one or more of the following types of wheels: caster wheels, ball casters, or onmi-wheels.

In a preferred embodiment the onboard motion tracking system is a conventional computer mouse mounted within the main body and configured to obtain data representative of the motion and/or position of the mouse relative to the support surface and transmit the data to the computer system. The data may be transmitted wirelessly via infrared or directly through a cable such as a universal serial bus.

In an alternative embodiment the onboard motion tracking system is an optical sensor arranged to capture continuous digital images of the support surface or a portion of the support surface on which the arm exercise device moves, and to generate image data representative of the motion and/or position of the arm exercise device. An image processing system on board the arm exercise device or integrated into the computer system receives and processes the image data to generate motion and/or positional data for processing by the computer system processor.

Preferably the secondary hand support handle comprises at least one operable switch. Preferably the switch(es) is(are) movably mounted to the secondary support handle via hook and loop fasteners.

Preferably the arm exercise device further comprises an associated fastening system that is operable to secure the user's forearm and/or hand to or within the main body. Preferably the forearm support portion of the main body forms a substantially U-shaped channel within which a user's forearm is received and retained during use of the system.

Preferably the primary hand support formation is a substantially hemispherical grip surface upon which the user may rest their hand when moving the main body over the surface. More preferably, the primary hand support formation is removably mounted to the hand support portion of the main body.

Preferably the application program is a game that is presented on the display screen of the computer system and the computer system is arranged such that movement of the arm exercise device over the surface by the user causes a corresponding movement of a game cursor on the game screen so as to enable the user to interact with the game. Activation of the switch (es) also causes further interaction with the game.

The phrase "interactive computer system" as used in this specification and claims is intended to mean, unless the context suggests otherwise, any hardware platform or system having a processor upon which an application program or software may run, including, but not limited to, a customised computer system, gaming console, gaming machine, smart television, or alternatively a standard Personal Computer, whether a desktop, laptop, notebook or handheld computer or portable communication device such as a Portable Digital Assistant (PDA), "smart" phone, or the like.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein, "(s)" following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

Overview of Arm Rehabilitation System

Figure 1:
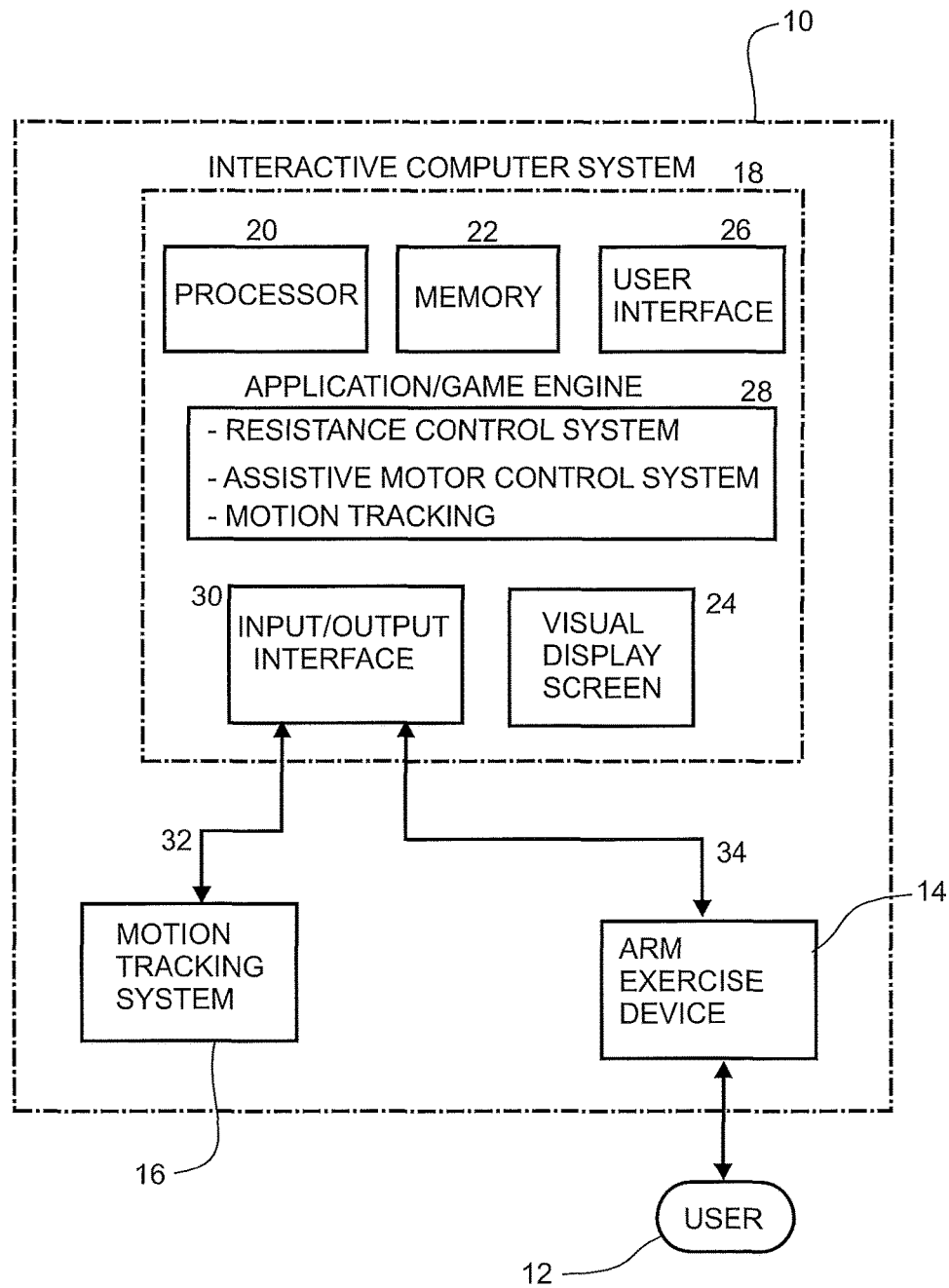
FIG. 1 is a block diagram showing the main components of an arm rehabilitation system in accordance with a preferred embodiment of the invention.
Figure 2:
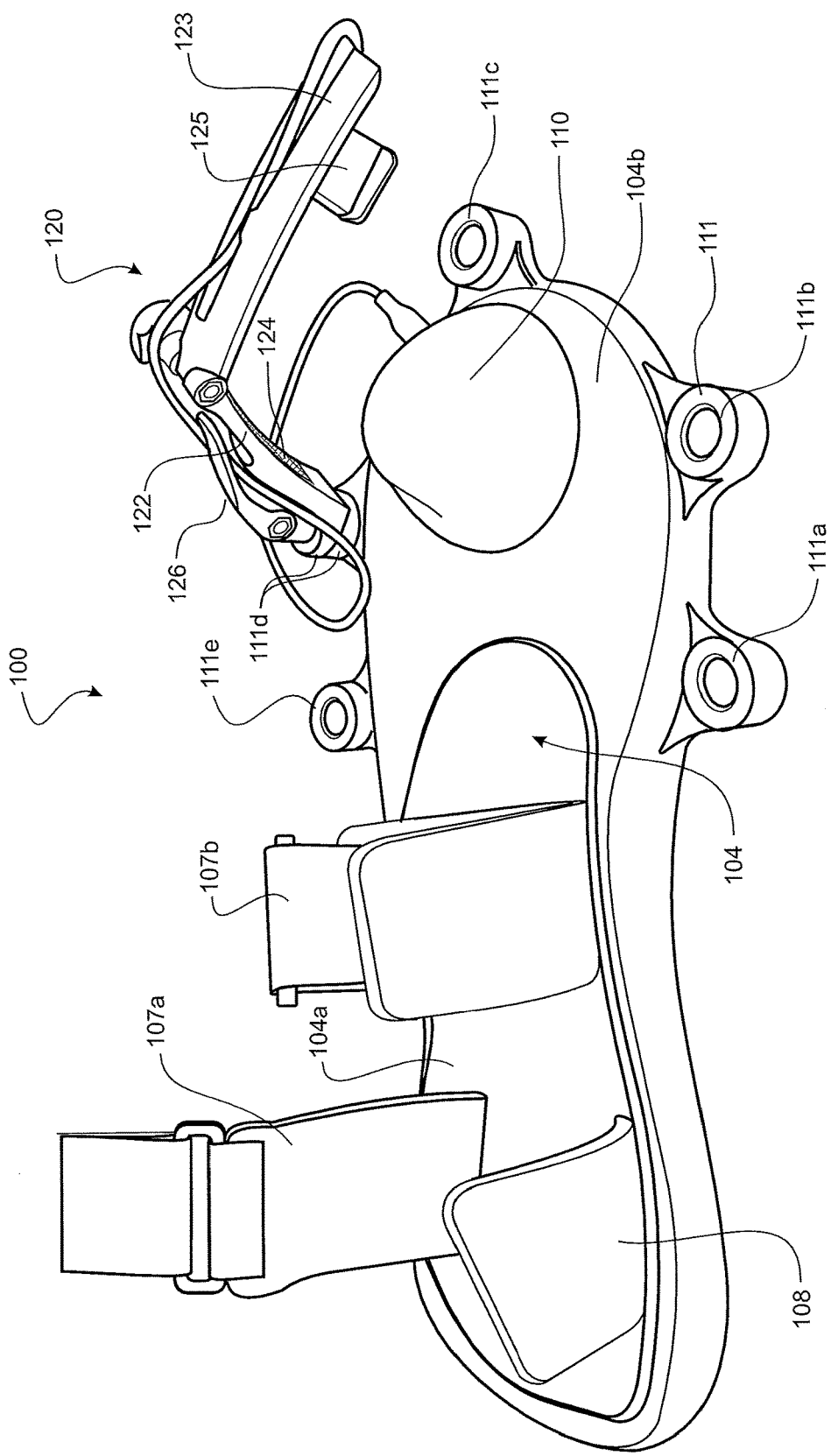
FIG. 2 is a drawing of a first preferred form arm exercise device of the invention.

Referring to FIG. 1, the invention relates generally to an arm exercise system 10 comprising a moveable arm exercise device 14 for supporting a user's 12 forearm and hand against gravity on a support surface to enable rehabilitation exercises to be carried out via interaction with a game or application program or other software run on an interactive computer system 18. The arm exercise device 14 may be in the form of an arm support tray that provides a mechanism for moveably engaging a support surface to enable the user 12 to move their affected arm over the support surface, when supported in or on the tray. The support surface may be a planar surface, such as a table top, or can alternately be a contoured surface. Additionally, the support surface may be substantially horizontal relative to the ground or alternately inclined or declined relative to the user to a desired angle. In one preferred form, the arm support device 14 comprises an under-surface configured to slidably engage and move upon the support surface.

In one preferred form, the arm support device comprises one or more mechanically operated switches, hand clickers, or other operable dials, buttons or knobs (hereinafter referred to as switches for convenience but other similar electronic inputs are not intended to be excluded from the scope of this invention) that may be positioned to require movement of the user's wrist or individual finger digits in order to be operated. In this manner, a clinician may enable a wrist or finger digit movement of the user's primary affected arm to be exercised during operation of the switches. The position of the switch(es) is(are) preferably adjustable to allow for a greater range of movements by the user to activate the switch(es). Adjustment of the position of the switch(es) allows the supervising clinician for example to force the user to carry out an exercise which extends their current ability in a particular direction thereby generating a range of motion useful for rehabilitation. A secondary support handle is also preferably provided on the tray for the user's other hand to grip simultaneously while their primary affected arm is supported in the tray to encourage bilateral training. Bilateral exercises are beneficial as they activate both brain hemispheres. One or more switches can also be provided on the secondary support handle to expand the range of possible movements for the second hand thereby enhancing the bilateral movement capabilities of the system.

To enable the user 12 to interact with the computer system 18 via movement of the arm exercise device 14, a motion tracking system 16 is provided that tracks the movement of the device 14 and generates position and/or movement data representing the position and/or movement of the device 14 relative to the support surface. The motion tracking system 16 may be entirely separate and external to the tray 14, entirely integrated with the tray, or have some components onboard the tray and other components located remote to the tray as part of the computer system 18 or independent of the computer system. In the preferred embodiment, the motion tracking system 16 is conventional wireless computer mouse system mounted within the support tray housing.

The interactive computer system 18 may be a customised computer system, gaming console, gaining machine, smart television, or alternatively a standard Personal Computer, whether a desktop, laptop, notebook or handheld computer or portable communication device such as a Portable Digital Assistant (PDA) or "smart" phone or any other hardware platform or system having a processor upon which an application program or software may run. In preferred forms, the interactive computer system 18 includes a processor 20, memory 22 and an output screen or visual display screen 24 upon which the application program or game is presented or displayed, such as a CRT monitor, Plasma screen, LCD screen or any other suitable electronic display device. A user interface 26, such as a conventional keyboard, mouse, touch pad, touch screen or other user input control device may also be provided to allow the user and/or their clinician to initiate or configure the application program or game as required.

Although not essential, the interactive computer system 18 may comprise an application/game engine 28 that stores and runs the application program or interactive game. By way of example, the application program may be any personal computer application program or game or alternatively a customised rehabilitation training game, including augmented and virtual reality games whether immersive or non-immersive. In operation, the user 12 uses their arm to move the tray 14 around the support surface and this movement enables them to interact with the application or gaming program presented on the visual display 24, much like moving a mouse on a mouse-pad. For example, in some forms, the movement of the tray 14 over the support surface may cause a corresponding movement of a cursor or pointer on the visual display screen 24. In other forms, such as augmented reality or virtual reality games, the user's hand or a graphical representation of the user's hand may be displayed on the screen 24 and move on screen to interact with the augmented or virtual reality environment in accordance with the tray's movement over the support surface. By way of example, an augmented reality based system may employ a machine vision motion tracking system that utilises an optical sensor, such as a webcam or digital camera, for capturing moving images of the user's arm and tray as it is moved over the support surface and the moving images are presented in real-time on the screen 24 with a game or application graphical overlay that the user can interact with in accordance with the game or application programming. Additionally, is the ability to interact with the application program by operation of the wrist or finger digit movement switches.

In the preferred form, the computer system 18 comprises an input/output interface 30 that is configured for transmitting and receiving data or information to and from one or more external devices in the exercise system. For example, the input/output interface 30 is arranged to communicate with the motion tracking system 16 over a communication link 32. For example, the motion tracking system 16 may be arranged to send position and/or movement data relating to position and/or movement of the tray 14 to the input/output interface 30 of the computer system 18 for processing by the application/game engine 28. Alternatively, a part of the motion tracking system 16, such as a webcam or digital camera, may be arranged to send image data over the communications link 32 to the computer system 18, and an image processing algorithm may be implemented on the computer system to generate the position and/or movement data from the images for processing by the application/game engine 28. It will be appreciated that the communication link 32 may be hardwired via cables or may utilise wireless communications protocols or links, such as Bluetooth or infrared.

The various components and modules of the arm exercise system 10, such as the computer system 18, motion tracking system 16, and arm support device 14 are shown as separate and distinct components for clarity, but it will be appreciated that these components can be combined in various ways and/or their functionality can be distributed between the modules, and that different hardware configurations and platforms can be utilised if desired. For example, the motion tracking 16 may be fully or partly integrated with either the computer system 18 or the arm exercise device 14, depending on design requirements.

Arm Exercise Device

Arm Support and Fastening System

Figure 3:
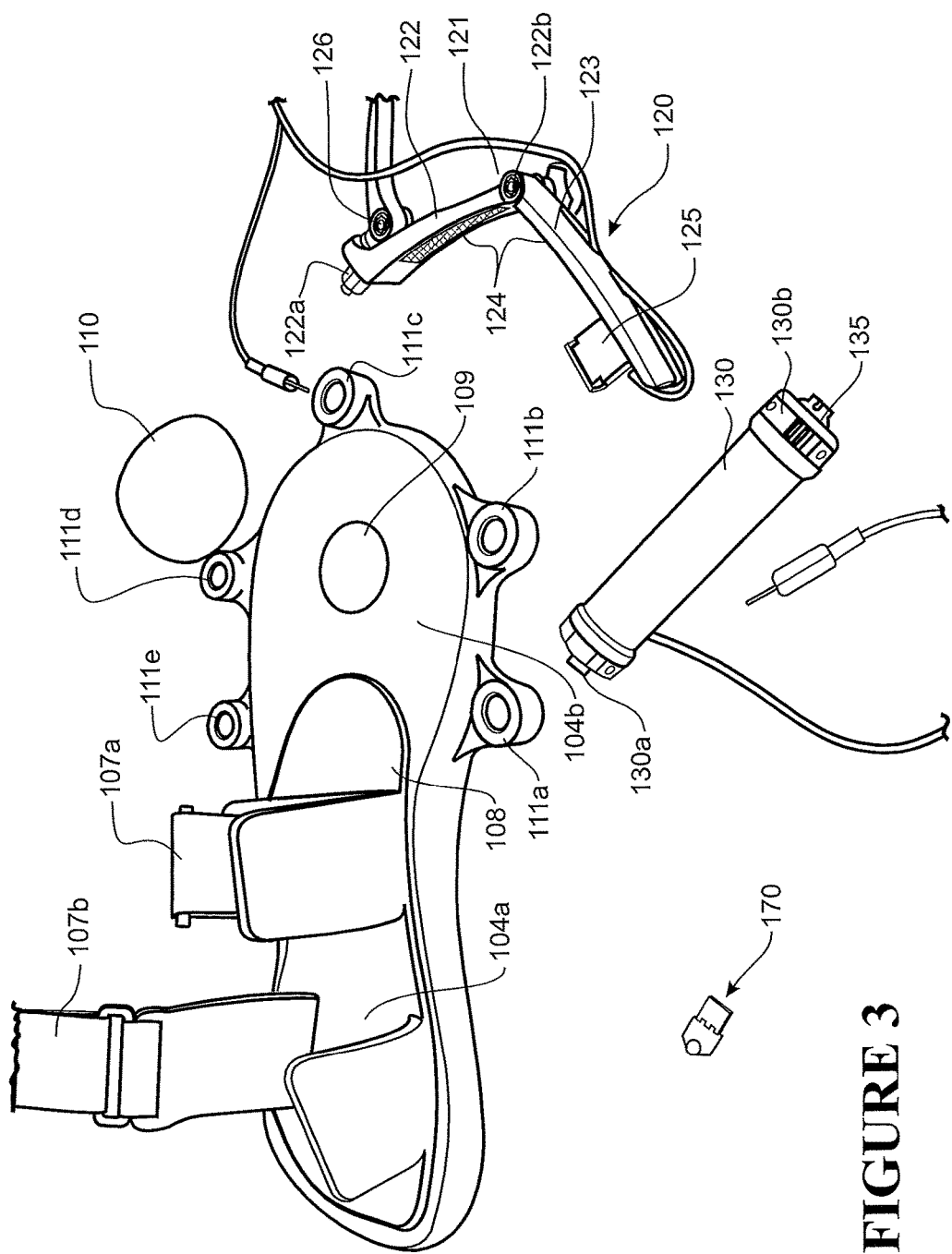
FIG. 3 is an exploded view of the arm exercise device of FIG. 1.
Figure 4:
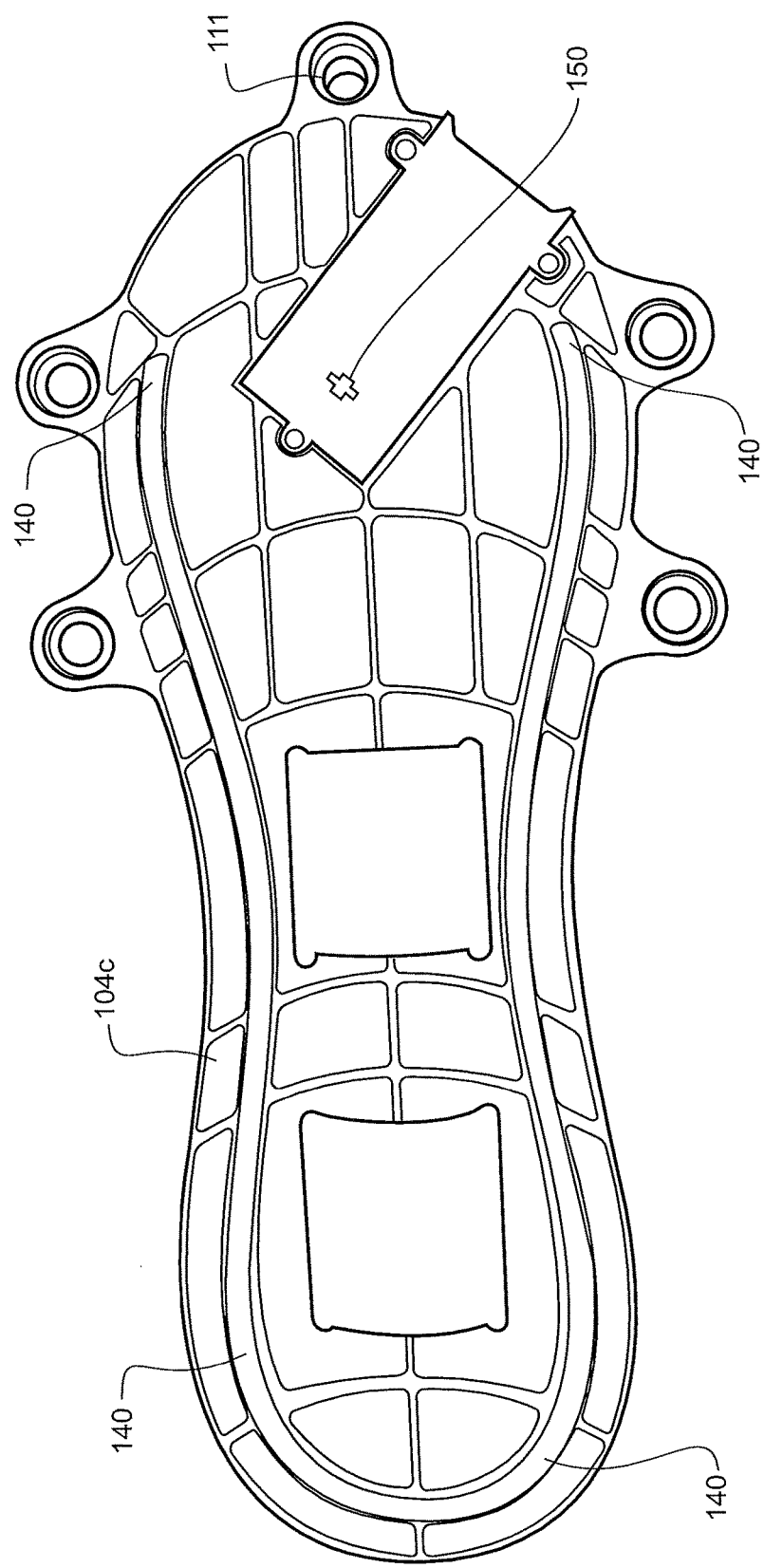
FIG. 4 shows a bottom view of the arm exercise device of FIG. 1.
Figure 5:
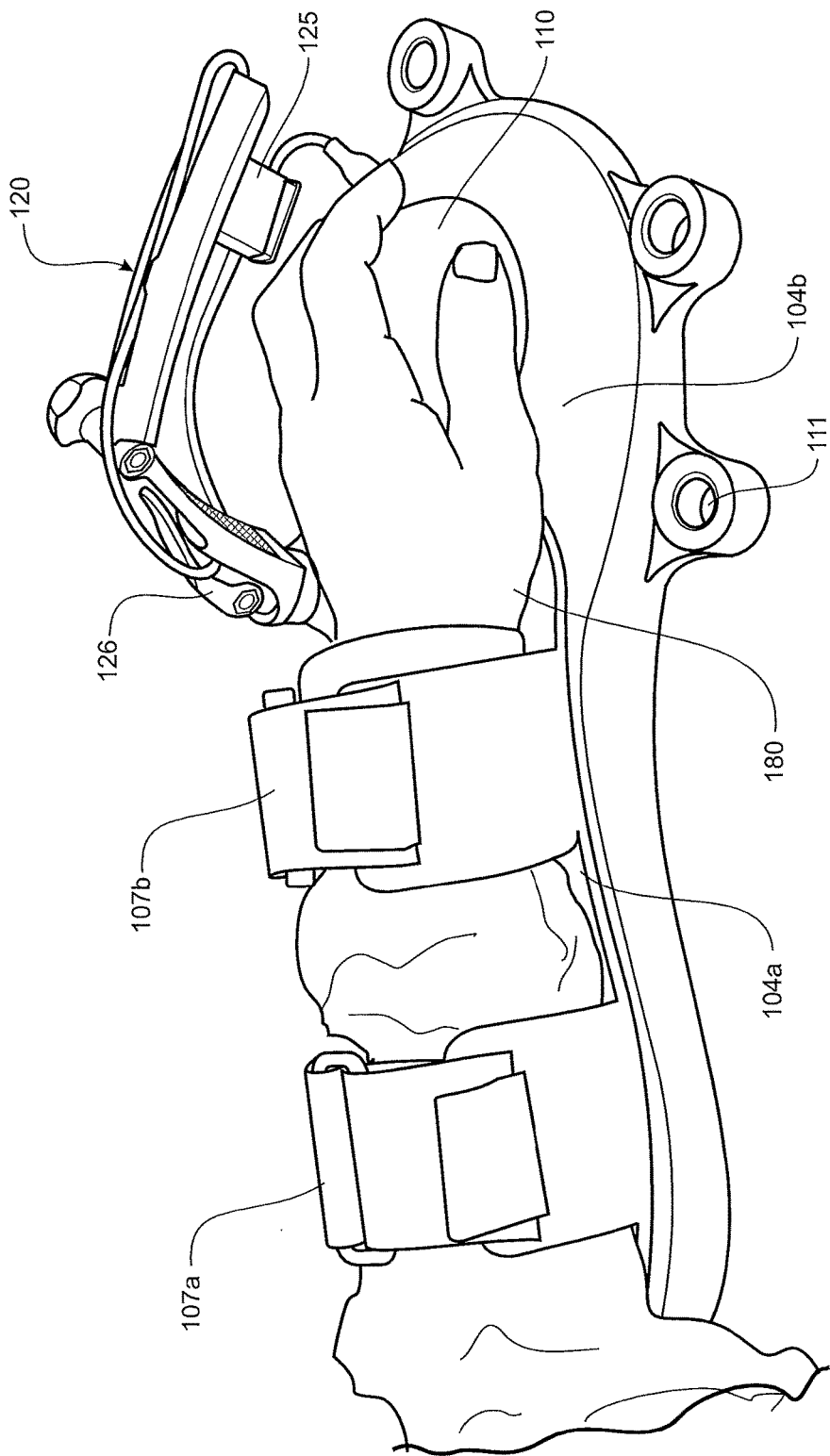
FIG. 5 shows the arm exercise device of FIG. 1 in use.

Referring to FIGS. 2-5, a first preferred form of arm exercise device 100 is shown comprising or in the form of a tray 104 for supporting part of a user's upper limb. The tray 104, and all associated components as will be described below, is made from any suitable material such as plastic, aluminium or wood, or any combination thereof. In this preferred form, the tray 104 is arranged to support a user's forearm and hand. The main housing or body of the tray 104 is elongate and comprises a forearm support portion 104*a* and a hand support portion 104*b*, which are integrally formed together. A fastening system in the form of hook and loop fasteners is provided in the forearm support portion for securing the user's forearm to the exercise device 100 (as shown in FIG. 5). In particular, a pair of hook and loop fastener straps 107*a/b* are provided for fastening the user's arm/wrist to the tray 104 but alternatively these may be buckled straps or some other fastening system that can be fastened around the user's arm/wrist to secure it on the tray 104. Hook and loop fastener strap 107a is provided for securing the user's forearm to the forearm support portion 104a, and hook and loop fasteners strap 107b is provided for securing the user's wrist to the hand support portion 104b. In some embodiments, the tray 104 may further comprise side walls extending upwardly from a base surface of the forearm support part 104a to form a substantially U-shaped or contoured channel along its length for receiving and supporting a user's forearm. An arm pad 108 is provided on the surface of the tray 104 to comfortably support the user's arm thereon. By way of example, the pad 108 may be formed from any suitable soft or deformable material, such as foam, rubber or the like.

Hand Support Formation

The hand support portion 104b of the tray 104 includes a hand support formation 110 that is securely retained in a recess or aperture 109 of the hand support portion 104b as shown in FIG. 3. In the preferred embodiment, the hand support formation 110 is in the form of a substantially hemispherical grip surface 110 that is frictionally and removably retained in a grip aperture 109 during assembly. The grip surface 110 is shaped to conform to a user's palm and fingers when their hand is relaxed over the surface 110 in use. The surface 110 is preferably asymmetric and not perfectly hemispherical to allow suitable conformation to the natural relaxed state of a disabled user's hand. Furthermore, the grip 110 is rotatably retained within the grip aperture 109 to enable rotational adjustment of the device 100 to conform to left or right hand usage modes for example. It will be appreciated that the grip 110, if not integrally formed, may be mounted on the hand support portion 104b, either fixedly or rotatably, in any alternative manner known in the art such as via a snap fit engagement between complementary formations formed appropriately on each part for example. In an alternative embodiment, the attachment/mounting means 109 is a hook and loop fastener 109 configured to engage a complementary under-surface of the of the hand support formation 110. Such an engagement system also provides a releasable coupling between the hand support formation 110 and the hand support portion 104b to enable adjustment of the rotatable position of the hand support formation 110 and/or disengagement of the hand support formation 110 from the hand support portion 104b.

Mounting Apertures

The hand support portion 104b of the tray 104 further comprises one or more mounting apertures 111 for receiving and retaining one or more components of the arm support device 100. In the preferred embodiment, five apertures 111a-e are provided separately spaced about the periphery of the hand support portion 104b. As explained in more detail below, each aperture 111a-e may be located to encourage certain hand, wrist or finger movements when used in conjunction with the additional components of the arm support device. The components may include one or more other hand clickers, switches, or other operable dials, buttons or knobs that can be operated by the hand or fingers of the user so as to assist them to interact with the games. For example, the switches may function similar to that of a left or right mouse button. The switches are preferably adjustably mounted in location around the hand, wrist and finger region and the switches may be incorporated into the interactive game so that the game play requires operation of the switches to assist with rehabilitation of the hand, wrist or one or more fingers. The location and position of adjustability of the switch is important as it allows the clinician to customise the position of the switch so as to require the patient to move their wrist hand and/or fingers in ways to encourage exercise of the effected joints. A squeeze ball type switch may also be provided to enable the user to grasp and operate the switch via a gripping motion. The proximity of the switches to the hand or part of the fingers or hands may be adjusted depending on the patient's capability. Additionally, resistance or springs may be added to the switches to increase the difficulty of actuating the switch from an exercise viewpoint.

Switch Support Boom Assembly

In the preferred embodiment, the exercise device 100 comprises a switch support boom assembly 120 configured to be mounted within any one of the mounting apertures 111a-e of the support tray 104. The boom assembly 120 comprises a boom 121 that can be removably mounted within any one of the mounting apertures 111a-e. This enables movement of the boom 121 between different apertures 111a-e. The boom 121 comprises a pair of pivotally coupled arms 122 and 123. One end 122a of the arm 122 is formed to removably engage a mounting aperture 111, and the opposing end 122b is formed to pivotally couple a corresponding formation on the second arm 123. A locking mechanism is preferably provided, such as a screw knob 126, to enable the two arms 122/123 to be locked in the desired pivotal position relative to one another after appropriate adjustment and before use. The mounting aperture engagement of arm 122 is also provided with a locking mechanism, such as a one quarter turn cam-lock clamp, which is operable by a user to lock the arm into a desired position after rotational adjustment within the mounting aperture.

The boom assembly 120 comprises and/or is configured to comprise one or more mechanically operated electronic input devices such as switches, hand clickers, or other operable dials, buttons or knobs. In the preferred embodiment, a switch 125 is removably coupled to the boom 121 for providing a means for user input during operation of the device 100. In particular, a coupling system 124 is provided on one or both arms 122/123 of the boom 121 to removably couple the switch 125 to a desired position one of the arms 121/122. In the preferred embodiment, a hook and loop fastening system (such as Velcro) is provided on both arms 121/122 and on the switch 125 to removably mount the switch 125 at any desired location on the boom 121.

The switch support boom assembly 120, as described above, is adjustable in position and orientation (via the rotational position of arm 122 within the mounting aperture and pivotal angle between the arms 122 and 123) so that the location of the switch relative the user's hand can be adjusted. This enables a clinician to adjust the location of the switch 125 according to the rehabilitative requirements of the particular patient. Patients recovering from a stroke for example, are generally subject to muscle flexing in and around the hand, giving reason as to why clinicians generally wish to exercise extension patterns. The boom assembly 120 can be adjusted accordingly to enable exercises of the wrist, hand and/or fingers in the extension direction. In the preferred embodiment, the boom assembly 120 allows the switch 125 to be positioned generally over the back of the hand 180 of the user, as shown in FIG. 5, so that exercises of the wrist, hand and/or fingers are in the extension direction.

The particular boom assembly 120 described enables adjustment of position and orientation of the switch 125 in the following manner:

The position of the boom 120 and hence location of the switch 125 can be adjusted to one of five discrete locations within the major plane of the tray 104 via the mounting apertures 111*a-e*. In alternative embodiments, the number and position of the discrete locations within the major plane may differ as required by the application. It is also envisaged that an alternative mechanism can be used in which the position of the boom 121 can be adjusted in a continuous manner over the major plane or a portion of the major plane of the tray 104.

The position of the switch 125 can be adjusted via rotation of arm 122 within the respective mounting aperture and/or via rotation of arm 123 relative to arm 122 (the latter only applicable when the switch is coupled to arm 123). The pivotal coupling between the two arms 122/123 of the boom 121 enables rotational adjustment of the relative positions (and of the switch 125 when coupled to arm 123) about a single axis, X, substantially parallel to the major plane of the tray 104. The direction of this axis, X, is adjustable via rotation of the boom 120 within the respective aperture 111 about an axis, Y, substantially orthogonal to the major plane of the tray 104. It is envisaged that other known mechanisms can be used for rotational adjustment of the boom arms 121/122 (and of the switch position) about any number of axes, such as via a ball joint coupling between arms 121 and 122 for example.

The translational position of the switch 125 along the arms 121/122 can be adjusted via the fastening system 124. It will be appreciated that the orientation of the switch 125 can be further adjusted by providing fastening systems on other external faces of the arms 121/122.

Secondary Support Handle

In the preferred embodiment, the arm exercise device 100 further comprises a hand grip that allows two handed operation of the tray 104. Such a hand grip may be desirable for the rehabilitation of a patient who has hemiparesis, a condition whereby one arm is considerably weaker than the other. If the clinician decides that the patient should use the stronger arm to assist the weaker arm then a handgrip which is an extended joystick will allow both hands to grip the device. A secondary support handle also encourages bilateral exercises which are known to be beneficial in terms of engagement of both brain hemispheres during exercise. This allows a clinician to prescribe bilateral exercises if they believe this will benefit their particular patient.

Referring to FIG. 3, a secondary support handle 130 is also provided by the device 100 for gripping by the hand of a user's other arm. The handle 130 can also be removably mounted within one of the apertures 111*a-e* of the hand support portion 104*b* such that when assembled, the handle 130 extends transversely or upwardly from the surface of the tray 104 at or near the periphery of the hand support portion 104*b*. An end 130*a* of the handle 130 is formed to be removably received and retained within one of the apertures 111*a-e*. This may be via friction fit, snap fit or any other suitable engagement. In alternative embodiments, the handle 130 may be fixedly coupled on the tray 104 or may otherwise be integrally formed with the tray 104. In the preferred embodiment, the secondary support handle 130 comprises one or more mechanically operated electronic input devices such as switches, hand clickers, or other operable dials, buttons or knobs. In the preferred embodiment, a switch 135 is provided at an opposing end 130*b* of the handle for operation by the user's stronger second hand/fingers. The switch is preferably fixedly mounted at the end 130*b* of the handle 130 but may alternatively be removably mounted as for the switch 125 on boom 121.

Movement Mechanism

Referring to FIG. 4, the underside of the tray 104 comprises a mechanism for enabling movement of the tray 104 over a support surface, such as a table. In the preferred embodiment, the tray 104 comprises a low friction slider strip material 140 located about the periphery of the tray 104 at its underside 104*c*. It will be appreciated, that the low friction material 140 may be a single material made up in a single strip and located about the entire or a majority of the periphery of the tray 104, or alternatively material may be made up of any one or more materials of any shape and located in any desired location on the underside of the tray 104 to effect a suitable sliding mechanism for the tray's 104 intended support surface.

In alternative embodiments, the underside of the tray 104 comprises one or more support wheels that are arranged to allow movement of the tray 104 over the support surface. The wheels may be are arranged to allow the tray 104 to move in any direction over the surface.

Motion Tracking System and Other Electronic Components

The arm exercise device 100 comprises one or more electronic components or systems for obtaining information regarding the usage of the arm exercise device and for interfacing/communicating with the interactive computer system. One or more user inputs (such as switches) and/or sensing components (such as motion sensors) or systems are provided within or on the main body 104 of the device 100 for acquiring information regarding the usage of the device. A processor (or more), such as a microprocessor, microcontroller or other programmable hardware device arranged or configured to receive the usage information and control/perform various interface and processing functions may also be provided. The arm exercise device 100 may also comprise an input/output interface that provides the main processor with a communication link to external devices and systems as necessary. For example, the input/output interface may be arranged to processed usage information from the exercise device to the computer system over the communications link for further processing by the computer system. In the preferred form, the input/output interface is in the form of a wireless transmission module, such as a Bluetooth module for transmitting and optionally receiving information wirelessly, but alternatively, a hardwired cable based interface medium for transmitting and receiving data and signals may be used if desired. The arm exercise device 100 preferably comprises on board power circuitry for powering the electrical circuitry and components of the device 100.

In the preferred embodiment usage information is obtained from one or more motion sensing components of the motion tracking system 150 and from the one or more switches 125/135 on board the device 100. The motion tracking system 150 is also responsible for processing the usage information and interfacing with the computer system to communicate the processed data as described above. The power circuitry may comprise an onboard battery supply or package that is preferably rechargeable.

In use, the motion tracking system is arranged to sense and track the motion of the tray 104 over the surface as moved by the user and send that information (alongside other usage information) to the computer system. The motion tracking system may be active or passive, and external or partially integrated but preferably fully integrated with the tray 104. The motion tracking system 150 preferably comprises one or more motion sensing components associated with the device for obtaining usage information regarding movement of the device 100. In the preferred embodiment, the entire motion tracking system 150 is mounted to the underside of the tray 104, preferably at the underside of the hand support portion as shown in FIG. 4 but alternatively at any other desired location on the tray 104.

By way of example, the motion tracking system 150 of the preferred embodiment is a conventional computer mouse, which may be an optical mouse or a roller-ball type mouse. This motion tracking capability enables the device 100 to interface with an interactive computer system through motion. The arm support device 100 can be used as a conventional mouse by moving the device 100 over the support surface to manipulate a program running on the interactive computer system.

In the preferred embodiment, the motion tracking system 150 is in the form of a wireless optical computer mouse system. Such a system operates by first directing a light signal (such as LED or laser) onto the support surface from a light source and then by taking continuous images of the support surface with an optical sensor, such as a camera, while the device 100 moves. A signal processing system within the motion sensing system 150 processes the images to detect changes in patterns and track motion accordingly. The motion sensing system 150 will output data representing the movement of the device 100, such as position, speed, direction and other useful motion based data. Position data may be sent in any particular format, but in some forms may be in X-Y coordinates with reference to a reference frame or 2-axis coordinate system relating to the support surface.

The underside of the tray 104 is substantially hollow and provides a cavity within which the electronic circuitry of the motion tracking system 150 can be mounted. A computer mouse Printed Circuit Board (PCB) can be fitted into the tray housing 104 and optionally powered by an onboard power supply, such as a rechargeable battery package. The PCB may be mounted on a mounting platform and the rechargeable battery package may be securely received and retained within a battery compartment accessible from an outer wall of the tray housing 104.

The motion tracking system 104 in addition to the one or more electronic inputs 125/135 provided on the boom assembly 120 and/or the secondary support handle respectively, provide an interface for the user to interact with the computer system. The electronic inputs 125/135 may therefore mimic the function of the left and right clickers of a conventional mouse. The inputs 125/135 are either directly coupled to the computer system via a wireless or cable connection, or preferably coupled to the computer system via the motion sensing system 150. In the preferred embodiment, and as shown in FIG. 3, each switch 125/135 has an associated cable 125a/135a for connecting to the motion tracking board 150 to transmit associated actuation signals to the tracking system 150. The cable connections 125a/135a are preferably a 3.5 mm plug connection but can alternatively be any other wired or wireless connections. The motion tracking system 150 is configured to communicate the actuation signal of the switch inputs 125/135 to the computer system in accordance with the operation of a conventional computer system for example.

Wireless transmission to the computer system is preferably achieved by connecting a separate wireless transmission hardware component, such as a radio frequency or Bluetooth adaptor 170, to the PCB 150 of the motion tracking system. This may be achieved by providing a USB port for receiving the radio frequency adaptor 170.

Interactive Computer System

Figure 7:
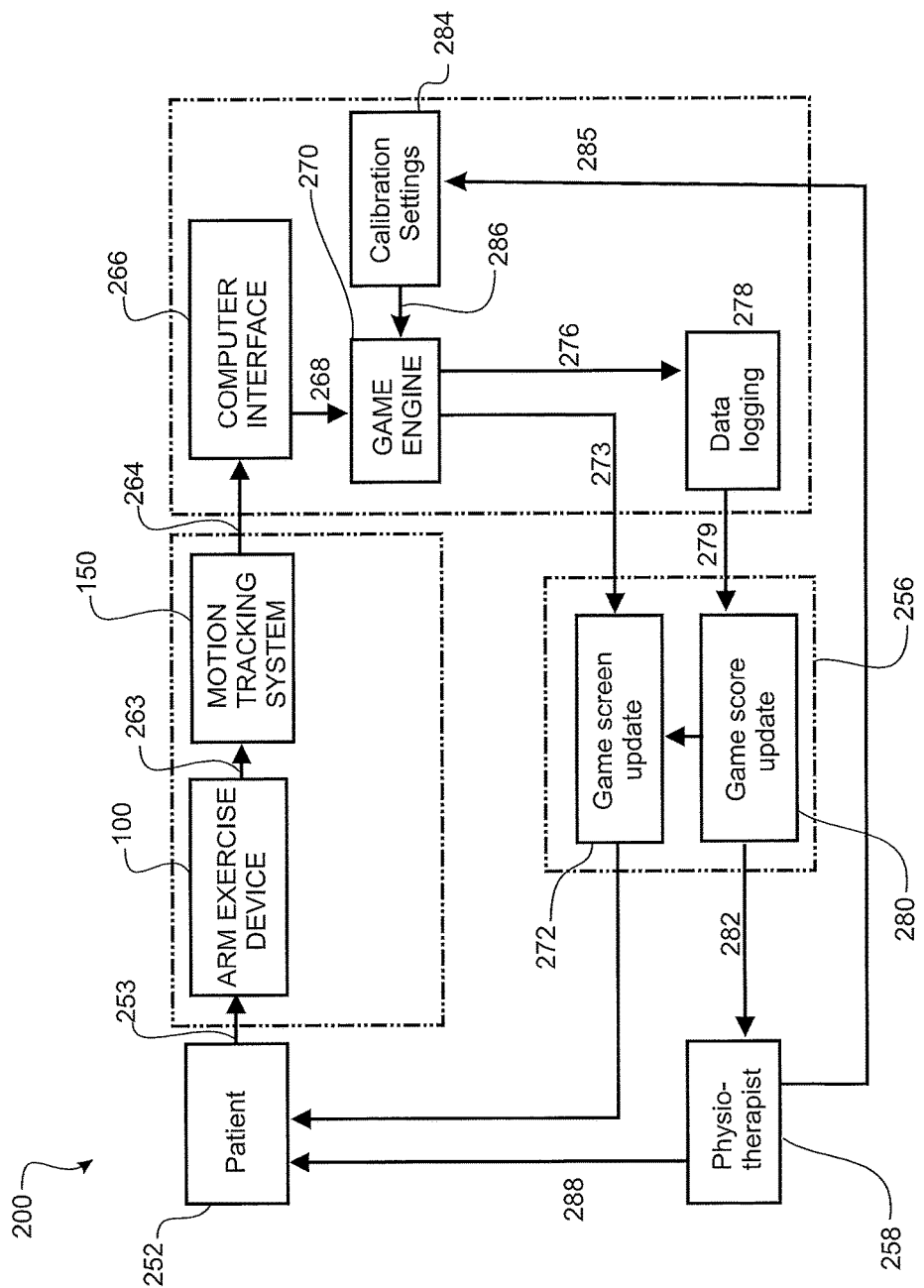
FIG. 7 shows a block diagram of the operation and interaction between various modules of an exercise system in accordance with an embodiment of the invention.

Referring to FIG. 7, an embodiment of the arm exercise system 200 that employs an arm exercise device of the preferred embodiment 100 will be described. By way of example, the flow of data, signals and interactions of the user, and in some cases their clinician, when operating the arm exercise system 200 will be explained. The patient or user 252 uses their arm to move the arm exercise device 100 in any desired direction upon a support surface, such as a tabletop or desk in order to interact with a game being presented on a visual display screen 256 that forms part of an interactive computer system. The patient's 252 interaction with the device 100 is represented by arrow 253.

In this example, the exercise device system employs a conventional optical laser based motion tracking system 150 of the type previously explained. Motion based data acquired from the motion tracking system 150 during operation of the device 100 is used as user interaction input for the game engine 270 that runs the game being displayed on the visual display screen 256. The game engine utilises the motion based data 268 to allow the user to interact with the game and complete the task or training required. In some forms, the position of the arm exercise device 100 on the support surface may correspond to a cursor or other graphic that is displayed on the visual display screen 256 and which is used to interact with the gaming environment displayed on the screen. As the game engine 270 receives the real time motion/position data 268 it uses this to update the game screen environment 272 by sending screen data 273. For example, game engine 270 is arranged to interpret position data 268 to allow the user to interact with the game or program, for example by updating the position of the game cursor on the display screen 256 such that movement of the tray 104 on the support surface causes a corresponding movement of the cursor on the screen 256. The game cursor may move around the display screen 256 at speeds and distances that are proportionate to the motion of the tray 104 over the surface as represented by the motion data 268. The game cursor may be in any form depending on the game, but could for example be a pointer, crosshair, or table tennis paddle for a table tennis game.

The motion data 268 may also be processed by the game engine 270 to record the user's training or task completion rate as they progress through the game and this gaming data 276 is recorded in a data log 278. The data log 278 may store the gaming information 276 in memory and also process that data and transmit the score information 279 to a game score update module 280 that is arranged to update the game score on the visual display screen 256 in real time for the user as they interact with the game. As the game progresses, the game score or other game information or data may give the user an indication as to whether any improvement is being made or not. Users may exercise for longer when interacting with computer or video games. Users may exercise to a higher physical level when a computer or video game score is provided based on the user's own historical performance.

In use, the patient's physiotherapist or clinician 258 may use the game score information 282 displayed on the visual display screen 256 to alter the game settings in accordance with the patient's rehabilitation program as the user progresses with their training. For example, the clinician 258 may manually alter calibration settings 284 as represented by arrow 285 in order to calibrate the game settings for the user's particular capability and training progression. In one embodiment, a computer programme or artificial intelligence may use the game score information and the patient's records of interactions with the system to automatically alter the game settings. The calibration settings 284 are transmitted as represented by 286 to the game engine 270 which reconfigures the game-play settings. Additionally, the clinician 258 may issue new instructions 288 to the patient 252 as to how they should interact with the game. For example, when a user first begins to use the arm exercise system, soon after an injury, the range of motion of their arm may be relatively small. To enable use of the full display screen 256, the system may alternatively be arranged to automatically calibrate by analysing the motion data 268 to calculate the range of motion of the user's arm. The display screen 256 may be calibrated so that the motion of the arm corresponds to the cursor moving across substantially the entire display screen 256. The system may recalibrate the display accordingly if the user's range of motion increases or decreases.

The computer system may be arranged to log or store the representative positional data 268. An associated time stamp may be logged with the data. The data may be stored in a database on a hard drive, or in any other suitable manner. This data can then be analysed at a later time, for example to assess whether the user is making sufficient progress with their rehabilitation. The data or results of the analysis may be used by a clinician 258 such as a physiotherapist to assess the progress of the rehabilitation. The game score or other game information may be logged, analysed, reported to or used by a physician 258 or other clinician in order to assess the progress of the rehabilitation also. The physician 258 or clinician may change the settings of the program remotely or non-remotely in order to update the rehabilitation according to the user's requirements. This may allow the physician 258 or clinician to adjust or override the user's rehabilitation exercise regime.

The tray 104 acts as an input device for interacting with game or other application program presented on the visual display 256. In preferred forms, the game may allow the user to compete against the program, such as a game of virtual table tennis. Alternatively, the game may allow the user to play alone, such as a puzzle game. Preferably, the program encourages the user to move the tray 104 to achieve an objective, such as winning a game of virtual table tennis, or completing a puzzle. Such encouragement means that the movements of the tray which the patient performs are task-based or goal-directed movements. That is that the computer provides a task which the patient must achieve by moving their arm. Task-based or goal-directed movements are desirable in terms of neuro-rehabilitation exercises. As the user interacts with the program, such as the game, it may encourage them to exercise their arm through movement of the tray 104. A user may be more inclined to exercise frequently, or for a longer period of time, if they are able to interact with a program in this way. A greater number of repetitions are desirable in terms of neuro-rehabilitation exercises. The user may become more mentally engaged in their exercise when interacting with the program. Exercising by interacting with a program may be less tedious than traditional, repetitive movement style exercise.

Alternative Embodiments and Features

Releasably Coupled Arm and Hand Supports

Figure 6:
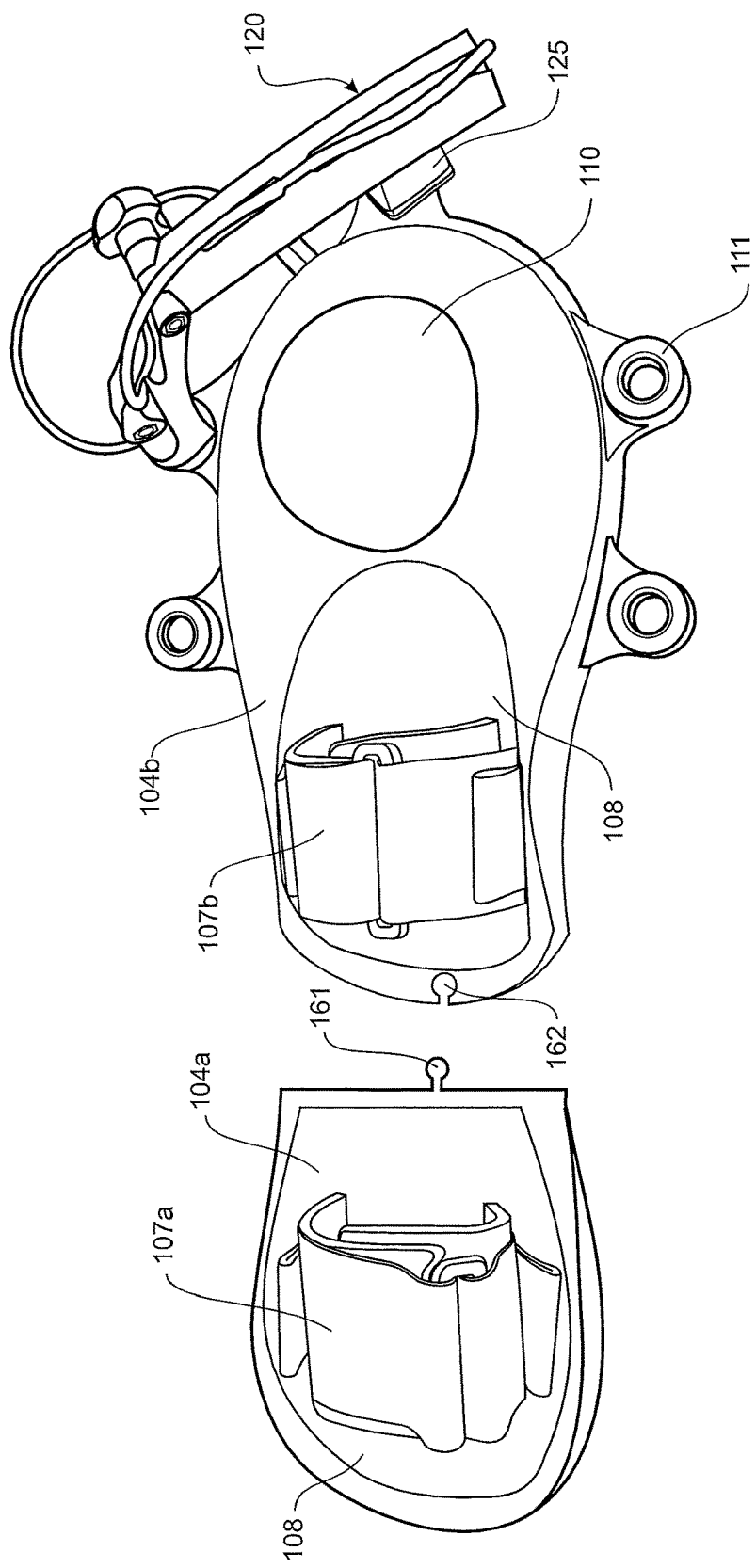
FIG. 6 shows an alternative form of the arm exercise device of FIG. 1 in which hand and forearm support portions of the main body are releasably coupled.

Referring to FIG. 6, the arm and hand support portions 104*a/b* of the support tray 104 are, in an alternative embodiment, releasably/separably coupled to one another to enable the tray 104 to be separated into two parts. In this manner, an advanced recovery rehabilitation patient with good shoulder movement for example, may be prescribed a treatment in which only the hand support portion 104*b* is utilised to promote lifting of the elbow without affecting the functionality of the exercise device 100. It is therefore preferred that the motion sensing system 150 of the invention is provided at the hand support portion 104*b* of the tray 104 as this will be the more active portion of the device 100. Complementary formations 161 and 162 are preferably formed at opposing ends of the two portions 104*a* and 104*b* of the tray 104 to provide a snap-fit engagement mechanism for coupling and uncoupling the portions 104*a/b*. It will be appreciated that the male and female joints, 161 and 162 respectively, can be the other way around as to what is shown in FIG. 6. Furthermore, other known mechanisms or releasable coupling systems for separably coupling the two portions of the tray may be employed without departing from the scope of the invention.

Arm Support Trolley with Wheels

As described briefly above, in alternative embodiments, the underside of the device body 104 may comprise one or more support wheels that are arranged to allow movement of the body 104 over the support surface. The wheels may be are arranged to allow the body to move in any direction over the surface. For example, the wheels provide the body with two degrees-of-freedom of movement over the surface including side-to-side movement, back and forth movement, and any combination of side-to-side and back and forth movement relative to the user. For example, the body may be in the form of a trolley comprising two wheels in the form of caster wheels, one of the caster wheels mounted underneath the trolley at or towards the front end of the trolley, and the other caster wheel mounted at or toward the rear end of the trolley. Each caster wheel comprises a wheel being mounted to a rotatable shaft having a rotation axis extending through a wheel block. The wheel block is rotatably mounted via a mounting plate to underneath the base of the trolley. The wheel block may be mounted for 360° rotation about a shaft extending substantially perpendicular to the base of the trolley. The wheels may alternatively be omni-wheels, spherical wheels, roller balls, ball wheels or any other suitable type of wheel or roller allowing movement of the trolley over the support surface. One or more wheels may be mounted in between the front and rear ends intermediate of the front and rear wheels. The types of wheels mounted underneath the housing may be identical or may be a mixture. The wheels can be made from any suitable material, such as plastic or metal.

A powered version of the arm exercise device may comprise one or more electronically controllable braking and/or driving actuators of an actuator system onboard the trolley associated with one or more of the support wheels. The computer system may be arranged to communicate with and control the actuator(s) of the actuator system onboard the trolley, to electronically control the braking and/or driving actuators associated with the one or more of the support wheels. The computer system may communicate with the actuator(s) over a wireless or hardwired communications link and may send actuator control signals to control the actuator(s) to apply braking or drive to the wheels of the trolley. The actuator(s) may also be controlled to be disengaged from the wheels to allow for free movement of the wheels. The actuator(s) may be controlled in accordance with the representative positional and/or movement data. If the user moves the trolley at or above a particular speed, the actuator(s) may be controlled to apply a level of braking to resist the movement of the wheels. This extra resistance may help with the rehabilitation of the user, for example by helping to build muscle tone. If the user moves the trolley at or below particular speed, the actuator (s) may be controlled to drive the movement of the wheels. This may help with the rehabilitation of the user, for example by training movement of the arm and extending limits of movement of the arm. The actuator(s) may be controlled to add resistance or drive to the wheels in any suitable manner. The actuators may be controlled to play the game or to assist in playing the game. The program may ascertain what movement should be made to complete a step of a game, such as moving a paddle in front of an approaching virtual table tennis ball or moving a puzzle piece from a location to another location, for example. The computer system may sense whether the user has attempted to make the required movement. The computer system may sense whether the user is struggling to make the required movement. If the user is struggling to make the required movement, the actuators may be controlled to drive the wheels to assist the user with making the required movement. If computer system senses that the user is able to consistently and easily make the required movements, the actuators may be controlled to resist the movement of the wheels.

In response to actuator control signals received from the computer system, a main controller onboard the arm exercise device may generate braking and/or motor actuator control signals for operating the braking control circuitry and assistive motor control circuitry. For example, the main controller may send braking control signals to the braking control circuitry for controlling one or more electromagnetic brakes associated with one or more wheels of the arm exercise device to apply a desired level or degree of braking resistance to rotation of the support wheel or wheels. Likewise, the main controller may be configured to generate motor control signals that operate the assistive motor control circuitry to drive one or more of electromagnetic motors coupled to one or more of the wheels to rotate them at a desired speed to assist movement of the arm exercise device over the support surface.

Alternative Motion Tracking Systems

The optical motion tracking system may comprise a tracking marker such as a tracking pattern, a tracking sticker, or a powered light or radiation source, such as an infrared LED. The marker is provided or mounted in a visible position on the device, such as on a front cover that covers all or part of the hand platform and the user's fingers. An external optical sensor, such as a webcam or digital camera, may then be used to capture continuous images of the trolley moving over the support surface. Image processing of those images can be performed by the motion tracking system to sense the tracking marker within the images and generate position data representing the movement of the device over the support surface. It will be appreciated that the motion tracking system may process the position data to generate other useful motion information relating to the trolley, such as the speed of movement, the direction of movement, the rotation of the trolley, the current and past positions of the trolley, and any other useful motion or movement information.

In other forms, the support surface itself could track the movement of the exercise device. For example, the surface may be a tablet PC device, and the device may comprise a magnet, stylus, or other tracking device on its underside so that the tablet PC device could track the movement of the exercise device. Alternatively, a grid pattern may be provided on the support surface. In this form of motion tracking system, the exercise device may comprise an optical sensor on its underside that is able to detect the grid pattern and ascertain the device's position on the surface.

Other onboard motion tracking systems could also be used in alternative forms of the system. Such motion tracking systems may employ inertial sensors, such as accelerometers. Alternatively, external system can be used to track the motion of the exercise device upon the surface, such as beacon based RF tracking or ultrasonic emitter technology.

Various configurations and components of the arm exercise device 100 for use in the arm exercise system 10 have been described by way of example only. It will be appreciated that the various configurations and functionality described may be combined, swapped or interchanged between different forms as desired according to the training requirement for the exercise system.

The foregoing description of the invention includes preferred forms thereof. Modifications may be made thereto without departing from the scope of the invention as defined by the accompanying claims.

The invention claimed is:

1. An arm rehabilitation system for exercising a user's arm, wrist, hand and/or fingers, comprising:
    an arm support device slideable upon a support surface by a user's first arm when the user's first arm is supported by the arm support device, the arm support device comprising:
        a main body configured to slidably engage the support surface via a low-friction sliding system provided on one side and comprising a hand support portion on an opposing side at or toward one end of the body for supporting a user's hand of the user's first arm;
        a primary hand support formation protruding from the hand support portion and shaped to engage with a palm and/or fingers of the user's hand of the user's first arm;
        an adjustable switch support boom assembly mounted to the main body and having at least one user operable switch for generating an actuation signal in response to operation by the user, the adjustable switch support boom assembly enabling adjustment of a position of the at least one user operable switch relative to the user's hand and/or fingers and/or wrist of the user's first arm;
        an onboard motion tracking system mounted to or within the main body which is configured to sense motion of the main body relative to the support surface and generate a representative motion signal; and
        an interactive computer system comprising a processor running an application program displayed on a visual display and which is in signal communication with the arm support device, the computer system receiving and processing the motion and/or switch signals to enable the user to interact with the application program via the arm support device.

2. An arm rehabilitation system as claimed in claim 1 wherein the adjustable switch support boom assembly is configured for both rotatable movement and hinged movement relative to the main body for adjusting a height and orientation of the adjustable switch support boom assembly.

3. An arm rehabilitation system as claimed in claim 2 wherein the adjustable switch support boom assembly comprises a first arm rotatably coupled to the main body and a second arm hingedly coupled to the first arm for adjusting a height and orientation of the adjustable switch support boom assembly.

4. An arm rehabilitation system according to claim 3 wherein the first arm of the adjustable switch support boom assembly is rotatable about an axis orthogonal to the major plane of the main body, and the second arm of the adjustable switch support boom assembly is rotatable about an axis parallel to the major plane of the main body.

5. An arm rehabilitation system as claimed in claim 2 wherein the height and orientation of the adjustable switch support boom assembly are selectively fixable in position thereby preventing movement due to interaction with the user.

6. An arm rehabilitation system as claimed in claim 1 wherein the at least one user operable switch is releasably and/or moveably coupled to the adjustable switch support boom assembly to allow for altering the position of the at least one user operable switch along the adjustable switch support boom assembly.

7. An arm rehabilitation system as claimed in claim 6 wherein the at least one user operable switch is releasably coupled to the adjustable switch support boom assembly by a coupling system.

8. An arm rehabilitation system as claimed in claim 7 wherein the coupling system is a hook and loop fastening system that is provided on at least one component of the adjustable switch support boom assembly and the at least one user operable switch assembly and each user operable switch.

9. An arm rehabilitation system as claimed in claim 1 further comprising a secondary hand support handle extending from the main body at or toward the periphery of the hand support portion for gripping by the hand of a second arm of the user.

10. An arm rehabilitation system as claimed in claim 9 wherein the secondary hand support handle comprises at least one operable switch that is movably mounted to the secondary support handle.

11. An arm rehabilitation system as claimed in claim 9 wherein the main body comprises a plurality of mounting apertures about a periphery of the hand support portion for removably mounting the secondary hand support handle.

12. An arm rehabilitation system as claimed in claim 1 wherein the main body further comprises a forearm support portion at or toward the opposite end of the hand support portion for supporting the user's forearm of the user's first arm.

13. An arm rehabilitation system as claimed in claim 1 wherein the main body comprises a plurality of mounting apertures about a periphery of the hand support portion for removably mounting the adjustable switch support boom assembly.

14. An arm rehabilitation system as claimed in claim 1 wherein the low-friction sliding system comprises a low friction material in the form of a slider strip located along or near the periphery of the main body on the side of the main body configured to slidably engage the support surface.

15. An arm rehabilitation system as claimed in claim 1 wherein the onboard motion tracking system is a conventional computer mouse mounted within the main body and configured to obtain data representative of a motion and/or position of the mouse relative to the support surface and transmit the data to the computer system.

16. An arm rehabilitation system as claimed in claim 1 wherein the arm support device further comprises an associated fastening system that is operable to secure the user's forearm and/or hand to or within the main body.

17. An arm rehabilitation system as claimed in claim 1 wherein the primary hand support formation is a substantially hemispherical grip surface upon which the user rest their hand when moving the main body over the support surface, and wherein the primary hand support formation is removably mounted to the hand support portion of the main body.

18. An arm rehabilitation system as claimed in claim 1 wherein the application program is a game that is presented on the display screen of the computer system and the computer system is arranged such that movement of the arm support device over the support surface by the user causes a corresponding movement of a game cursor on the display screen so as to enable the user to interact with the game.

19. An arm rehabilitation system as claimed in claim 1 wherein a height and orientation of the adjustable switch support boom assembly is operable to position the at least one user operable switch generally above and/or over the back of the hand of the user.

20. An arm rehabilitation system as claimed in claim 1 wherein a height and orientation of the adjustable switch support boom assembly is configured to enable the position of the at least one user operable switch to be configured for extension movements of the user's hand and/or fingers and/or wrist.

21. An arm rehabilitation system as claimed in claim 1 wherein the low friction sliding system comprises a portion or portions of low-friction material of any shape and location on the side of the main body configured to slidably engage the support surface.

22. An arm, wrist, hand and/or fingers rehabilitation device that is slideable upon a support surface by a user's first arm when the user's first arm is supported by the arm rehabilitation device, the device comprising:
a main body configured to slideably engage the support surface via a low-friction sliding system provided on one side and comprising a hand support portion on an opposing side at or toward one end of the body for supporting a user's hand of the user's first arm;
a primary hand support formation protruding from the hand support portion and shaped to engage with the palm and/or fingers of the user's hand of the user's first arm;
an adjustable switch support boom assembly mounted to the main body and having at least one user operable switch for generating an actuation signal in response to operation by the user, the adjustable switch support boom assembly enabling adjustment of a position of the at least one user operable switch relative to the user's hand and/or fingers and/or wrist of the user's first arm; and
an onboard motion tracking system mounted to or within the main body which is configured to sense motion of the main body relative to the support surface and generate a representative motion signal, and wherein the arm rehabilitation device is configured to communicatively couple an interactive computer system to communicate the generated motion and/or actuation signals to the interactive computer system in use, and enable user interaction with the computer system via the arm rehabilitation device.

23. An arm rehabilitation device as claimed in claim 22 wherein the adjustable switch support boom assembly is configured for both rotatable movement and hinged movement relative to the main body for adjusting a height and orientation of the adjustable switch support boom assembly.

24. An arm rehabilitation device as claimed in claim 23 wherein the adjustable switch support boom assembly comprises a first arm rotatably coupled to the main body and a second arm hingedly coupled to the first arm for adjusting the height and orientation of the adjustable switch support boom assembly.

25. An arm rehabilitation device as claimed in claim 24 wherein the first arm of the adjustable switch support boom assembly is rotatable about an axis orthogonal to the major plane of the main body, and the second arm of the adjustable switch support boom assembly is rotatable about an axis parallel to the major plane of the main body.

26. An arm rehabilitation device as claimed in claim 23 wherein the height and orientation of the adjustable switch support boom assembly are selectively fixable in position thereby preventing movement due to interaction with the user.

27. An arm rehabilitation device as claimed in claim 22 wherein the at least one user operable switch is releasably and/or moveably coupled to the adjustable switch support boom assembly to allow for altering the position of the at least one user operable switch along the adjustable switch support boom assembly.

28. An arm rehabilitation device as claimed in claim 27 wherein the at least one user operable switch is releasably coupled to the adjustable switch support boom assembly by a coupling system.

29. An arm rehabilitation device as claimed in claim 28 wherein the coupling system is a hook and loop fastening system that is provided on at least one component of the adjustable switch support boom assembly and each of the at least one user operable switch assembly and each user operable switch.

30. An arm rehabilitation device as claimed in claim 22 further comprising a secondary hand support handle extending from the main body at or toward the periphery of the hand support portion for gripping by the hand of a second arm of the user.

31. An arm rehabilitation device as claimed in claim 30 wherein the secondary hand support handle comprises at least one operable switch that is movably mounted to the secondary support handle.

32. An arm rehabilitation device as claimed in claim 30 wherein the main body comprises a plurality of mounting apertures about a periphery of the hand support portion for removably mounting the secondary hand support handle.

33. An arm rehabilitation device as claimed in claim 22 wherein the interactive computer system comprises a processor running an application program displayed on a visual display and which is in signal communication with the arm exercise device in use, the computer system receiving and processing the motion and/or actuation signals to enable the user to interact with the application program via the arm exercise device.

34. An arm rehabilitation device as claimed in claim 33 wherein the application program is a game that is presented on the display screen of the computer system and the computer system is arranged such that movement of the arm exercise device over the support surface by the user causes a corresponding movement of a game cursor on the display screen so as to enable the user to interact with the game.

35. An arm rehabilitation device as claimed in claim 22 wherein the main body further comprises a forearm support portion at or toward the opposite end of the hand support portion for supporting the user's forearm of the user's first arm.

36. An arm rehabilitation device as claimed in claim 22 wherein the main body comprises a plurality of mounting apertures about a periphery of the hand support portion for removably mounting the adjustable switch support boom assembly.

37. An arm rehabilitation device as claimed in claim 22 wherein the low-friction sliding system comprises a low friction material in the form of a slider strip located along or near the periphery of the main body on the side of the main body configured to slidably engage the support surface.

38. An arm rehabilitation device as claimed in claim 22 wherein the onboard motion tracking system is a conventional computer mouse mounted within the main body and configured to obtain data representative of a motion and/or position of the mouse relative to the support surface and transmit the data to the computer system.

39. An arm rehabilitation device as claimed in claim 22 wherein the arm rehabilitation device further comprises an associated fastening system that is operable to secure the user's forearm and/or hand to or within the main body.

40. An arm rehabilitation device as claimed in claim 22 wherein the primary hand support formation is a substantially hemispherical grip surface upon which the user rest their hand when moving the main body over the support surface, and wherein the primary hand support formation is removably mounted to the hand support portion of the main body.

41. An arm rehabilitation device as claimed in claim 22 wherein a height and orientation of the adjustable switch support boom assembly is operable to position the at least one user operable switch generally above and/or over the back of the hand of the user.

42. An arm rehabilitation device as claimed in claim 22 wherein a height and orientation of the adjustable switch support boom assembly is configured to enable the position of the at least one user operable switch to be configured for extension movements of the user's hand and/or fingers and/or wrist.

43. An arm rehabilitation device as claimed in claim 22 wherein the low friction sliding system comprises a portion or portions of low-friction material of any shape and location on the side of the main body configured to slidably engage the support surface.

* * * * *